United States Patent
Lin et al.

(10) Patent No.: US 6,323,622 B1
(45) Date of Patent: Nov. 27, 2001

(54) METHOD AND SYSTEM FOR ENSURING LIFE-TIME OF RECHARGED BATTERY INSIDE PORTABLE ELECTRONIC DEVICE

(75) Inventors: Kuang-Shin Lin; Tong S Chen, both of Taipei (TW); Yuan Bin, Tien-Chin (CN)

(73) Assignee: Inventec Corporation (TW)

( * ) Notice: Subject to any disclaimer, the term of this patent is extended or adjusted under 35 U.S.C. 154(b) by 0 days.

(21) Appl. No.: 09/699,561

(22) Filed: Oct. 31, 2000

(51) Int. Cl.[7] ...................................................... H02J 7/00
(52) U.S. Cl. ........................................... 320/132; 320/130
(58) Field of Search ................................... 320/132, 130, 320/136, 139, 155; 324/426; 340/636

(56) References Cited

U.S. PATENT DOCUMENTS

| | | | |
|---|---|---|---|
| 5,818,204 | * 10/1998 | Banyas et al. | 320/153 |
| 5,969,625 | * 10/1999 | Russo | 340/636 |
| 6,031,359 | * 2/2000 | Michelsen et al. | 320/141 |
| 6,160,382 | * 12/2000 | Yoon et al. | 320/136 |

* cited by examiner

*Primary Examiner*—Peter S. Wong
*Assistant Examiner*—Lawrence Luk

(57) ABSTRACT

The invention is related to method(s) and system for ensuring lifetime of recharged battery built-in portable electronic device. The method comprises: receive a predetermined range of electricity power; perform an electricity power testing process to measure an actual account of electricity power of a recharged battery that built-in a portable electronic device; and perform an electricity power adjusting process to let the actual account is modified into the predetermined range whenever the actual account is out the predetermined range. The system comprises receiving means for receiving a predetermined range and a predetermined period; measuring means for measuring an actual account of electricity power of the recharged battery set; determining means for comparing the actual account with the predetermined range and determining whether adjusting the actual account or not; charging means for charging the recharged battery set and to let the actual account is modified into the predetermined range whenever the actual account is lower than the predetermined range; and discharging means for discharging the recharged battery set and to let the actual account is modified into the predetermined range whenever the actual account is higher than the predetermined range.

17 Claims, 4 Drawing Sheets

METHOD AND SYSTEM FOR ENSURING LIFE-TIME OF RECHARGED BATTERY INSIDE PORTABLE ELECTRONIC DEVICE

BOTTOMGROUND OF THE INVENTION

1. Field of the Invention

The invention relates to method and system for ensuring lifetime of recharged battery built-in portable electronic device, and also relates to method and system for production line to remain electricity power account of a recharged battery set which built-in a portable electrical device.

2. Description of the Prior Art

Because recharged battery can be long-time used by repetitively charging, traditional battery is gradationally replaced by recharged battery in accordance with both price reduction of charged battery and increased requirement of portable electronic device. In general, specification of recharged battery used by walkman is similar to traditional battery, and also is not built-in walkman but the user must extra buy charged battery before a new walkman is used. By contrast, specification of recharged battery used by portable electronic device, such as notebook computer, is different from traditional battery, and is built-in portable electronic device. Thus, the user acquires both portable electronic device and required charged battery at the same time that the user buys the portable electronic device.

However, for most of production lines, because it is necessary to integrate recharged battery with portable electronic device and to test them as a whole, charged battery is built-in portable electronic device before portable electrical device testing processes are performed. In other words, it is a seldom case that saturated recharged battery is built-in after these portable electrical device testing processes are finished. Therefore, an unavoidable trouble is that account of recharged battery built-in produced portable device, all testing process have been just finished, not only is not saturated (charge is consumed by these processes) but also is not fixed (depends on practical details of undergo processes).

Additional, though relationship between charge account and time relation, which acquired from these testing processes, can be used to assist first user of a portable electrical device in handling how long the portable electrical device can operate before it is necessary to charge built-in recharged battery. But because neither manufacturer not vendor can assure produced portable electronic device can be delivered to an end-user in a short period, and also because that lifetime of a recharged battery is decreased when actual account of electricity power of the recharged battery is remained in a high level or a low level for a long time. An unavoidable deletion is that lifetime of recharged battery of produced portable electronic device is shorten by improper account of electricity power of built-in recharged battery, and then both encumbrance (accessible time of recharged battery is reduced) and trouble (built-in charged battery is difficult to renew) of end-user is increased.

As a summary, because current production line of portable electronic device can not ensure actual account of electricity power of built-in recharged battery is located in a suitable range for long-time conservation, it is desired new method and system for testing and adjusting actual account of recharged battery.

SUMMARY OF THE INVENTION

A main object of the present invention to provide method and system for lengthening lifetime of recharged battery.

It is another object of the present invention to provide a simple and effective method and system for remaining electricity power account of a recharged battery set, which built-in a portable electrical device, without irneglectable extra cost and obvious modification.

One preferred embodiment is a method for ensuring lifetime of recharged battery built-in portable electronic device, at least includes following steps: receive a predetermined range of electricity power; perform an electricity power testing process to measure an actual account of electricity power of a recharged battery that built-in a portable electronic device; and perform an electricity power adjusting process to let the actual account is modified into the predetermined range whenever the actual account is out the predetermined range.

Another preferred embodiment is a system for production line to ensure lifetime of recharged battery built-in portable electronic device, at least includes following steps: receiving means for receiving a predetermined range and a predetermined period; measuring means for measuring an actual account of electricity power of the recharged battery set; determining means for comparing the actual account with the predetermined range and determining whether adjusting the actual account or not; charging means for charging the recharged battery set and to let the actual account is modified into the predetermined range whenever the actual account is lower than the predetermined range; and discharging means for discharging the recharged battery set and to let the actual account is modified into the predetermined range whenever the actual account is higher than the predetermined range.

BRIEF DESCRIPTION OF THE DRAWINGS

The above objects, and other features and advantages of the present invention will become apparent after a reading of the following detailed description taken in conjunction with the drawings, in which.

DESCRIPTION OF THE PREFERRED EMBODIMENT

First of all, it should be emphasized that because lifetime of recharged battery is reduced whenever actual account of electricity power is remained too high or too low for a long time, lifetime of recharged battery can be properly lengthened by remaining actual account of recharged battery of produced portable electronic devices in a moderate range. By the way, even the period between portable electronic device is produced and an end-used acquires the portable electronic device is long, quality of recharged battery still is not degraded. However, it should be emphasized that so-called moderate range strongly depends on variety of recharged battery. For example, for lithium ion recharged battery and manganese-hydrogen recharged battery, the moderate range is about two fifth to three fifth of a maximum account of electricity power of recharged battery.

One preferred embodiment of the present invention is a method for ensuring life of recharged battery in said portable electronic device, wherein available varieties of portable electronic device includes notebook computer and personal digital assistant.

Figure 1:
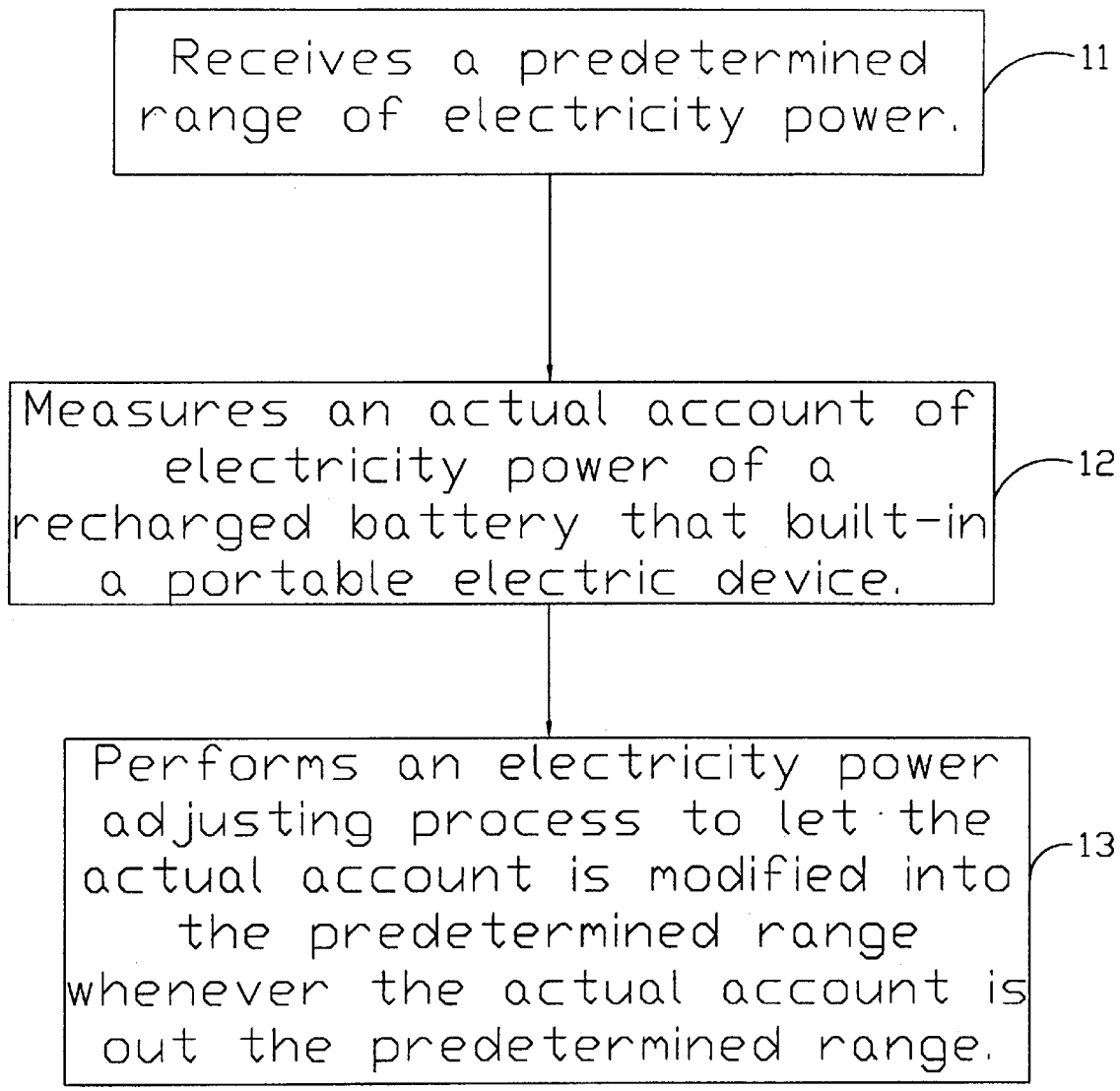
FIG. 1 is a brief flow-chart of one preferred embodiment of the invention.

As FIG. 1 shows, the method at least includes following steps: as receiving block 11 shows, receives a predetermined range of electricity power; as testing block 12 shows, performs an electricity power testing process to measure an (original) actual account of electricity power of a recharged battery that built-in a portable electronic device; and as adjusting block 13 shows, performs an electricity power adjusting process to let the actual account is modified into the predetermined range whenever the (original) actual account is out the predetermined range.

Herein, the recharged battery is suitable for longdated storage without reduction of lifetime whenever the actual account is in said predetermined range. Further, the predetermined range usually is about two fifth to three fifth of a maximum account of electricity power of the recharged battery.

Besides, the electricity power adjusting process further comprises a charging process which is performed whenever the (original) actual account is lower than the predetermined range. Herein, the charging process increasing the actual account and let the (original) actual account is modified into the predetermined range. Besides, the electricity power adjusting process also further comprises a discharging process that is performed whenever the (original) actual account is higher than the predetermined range. Herein, the discharging process decreasing the (original) actual account and let the actual account is modified into the predetermined range.

Obviously, the embodiment can be practical applied in many conditions. For instance, when a portable electronic device just is produced in a production line, the embodiment can be performed to let actual account of electricity power of charged battery is suitable for long-time storage. Another example is that when a user ensure a portable electronic device will not be used during a long period, the embodiment can be used to protect built-in recharged battery. Further, because the embodiment only requires two simple processes, electricity power testing process and electricity power adjusting process, to let recharged battery is suitable for long-time storage, it is a excellent way to ensure quality of portable electronic device during transport, storage and delivery.

Figure 2A:
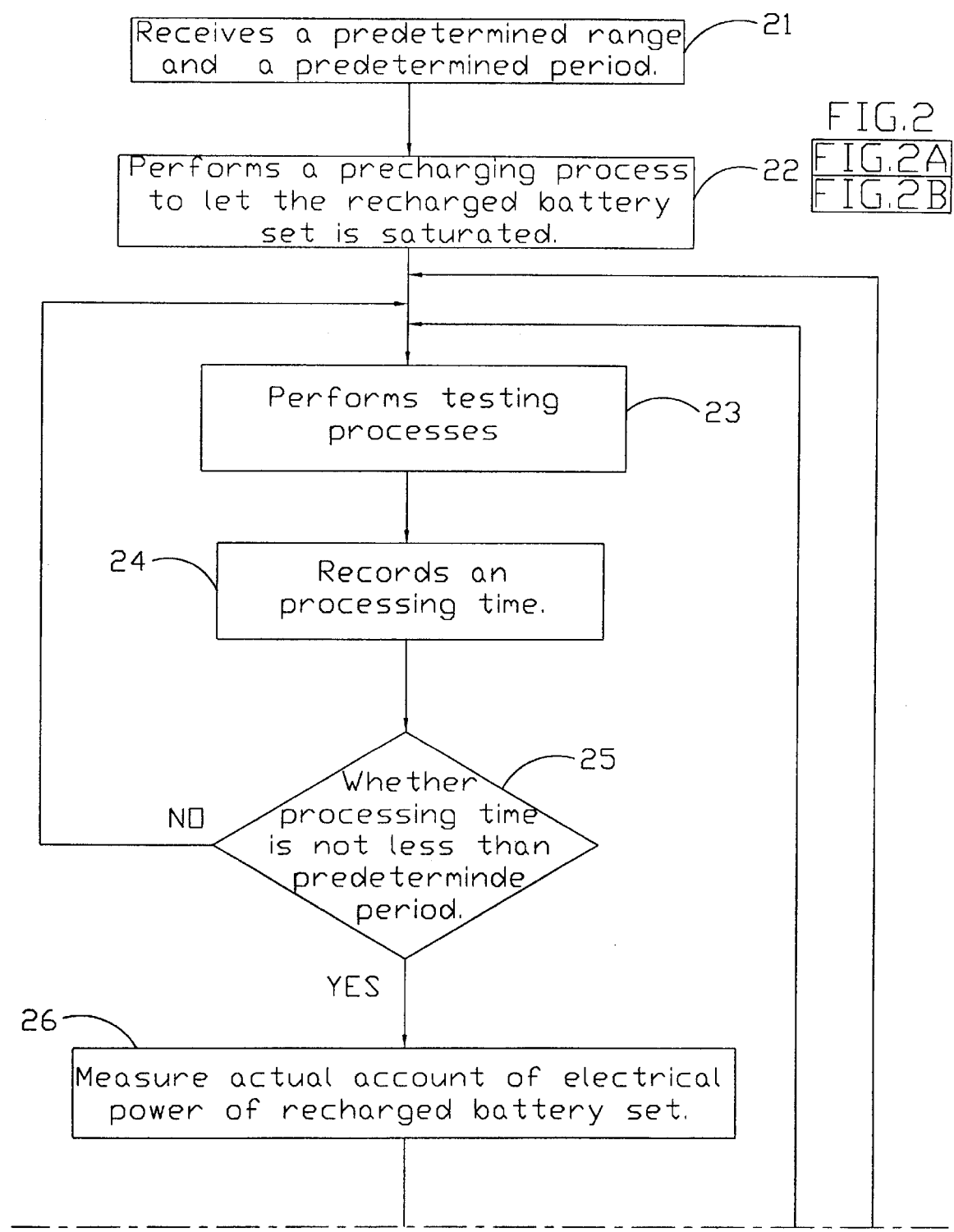
FIG. 2A and FIG. 2B are a brief flow-chart of another preferred embodiment of the invention.
Figure 2B:
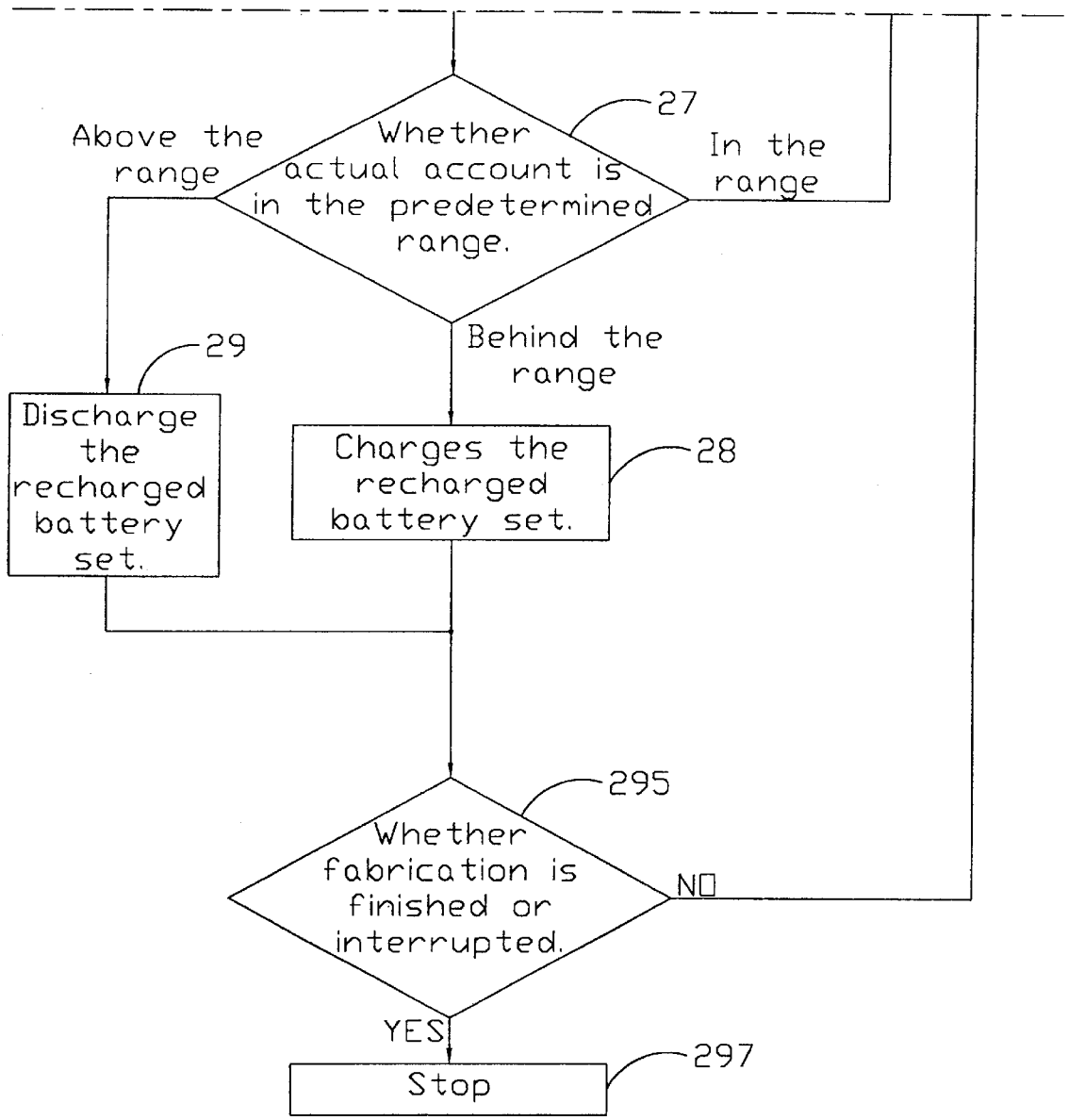

Because in practical production line the portable electronic device requires a definite fabrication period, and then lifetime of recharged battery maybe is reduced for actual account of electricity power is decreased during the definite fabrication period. Another preferred embodiment is method for a production line to remain electricity power account of a recharged battery set which built-in a portable electrical device, such as notebook computer. The method at least includes following steps that are performed incident to fabricating processes and are shown in both FIG. 2A and FIG. 2B.

As receiving condition block 21 shows, receives a predetermined range and a predetermined period. Herein, the recharged battery set is suitable for longdated storage without reduction of lifetime whenever an actual account of electricity power of a recharged battery is in the predetermined range. Moreover, the predetermined range is about two fifth to three fifth of a maximum account of electricity power of the recharged battery set.

As initially charging block 22 shows, performs a precharging process to let the recharged battery set is saturated.

As process and test block 23 shows, performs at least a portable electrical device testing process. Herein, an actual account of electricity power of the recharged battery set will be decreased along the test processes.

As initially timing block 24 shows, records an processing time that the portable electronic device undergoes performed portable electrical device testing processes.

As time decision block 25 shows, decides whether the processing time is less than the predetermined period or not. If the processing time is less than the predetermined period, then performs initially timing block 24 again. Otherwise, as measure block 26 shows, performs an electricity power testing process to measure the actual account of electrical power of the recharged battery set.

As deciding block 27 shows, decides whether the actual account is in the predetermined range or not. As it locates in the predetermined range, continuately timing and performs process and test block 23 again.

Obviously, when the actual account is not in the predetermined range, owing to the truth that portable electronic device still is processed in the production line, in order to avoid quality of recharged battery set is degraded, it is necessary to performs an electricity power adjusting process to let the actual account is modified into the predetermined range. As charging process block 28 shows, whenever the actual account is lower than the predetermined range, charges the recharged battery set to let the actual account is modified into the predetermined range. As discharging process block 29 shows, whenever the actual account is higher than the predetermined range, discharges the recharged battery set to let the actual account is modified into the predetermined range.

As flow decision block 295 shows, decides whether fabrication of portable electronic device is finished or interrupt instruction is received. If both answer are no, then resets the processing time to zero and repeating initially timing block 24 to discharging process block 29. If at least one answer is yes, then terminates operation of the production line, as stop block 297 shows.

Furthermore, in order to ensure quality of produced portable electronic device, the embodiment further comprises a step of performing both electricity power testing process and electricity power adjusting process again whenever these portable electrical device testing processes are finished. Besides, the embodiment also further comprises terminating both electricity power testing process and electricity power adjusting process whenever these portable electrical device testing processes are finished.

Figure 3:
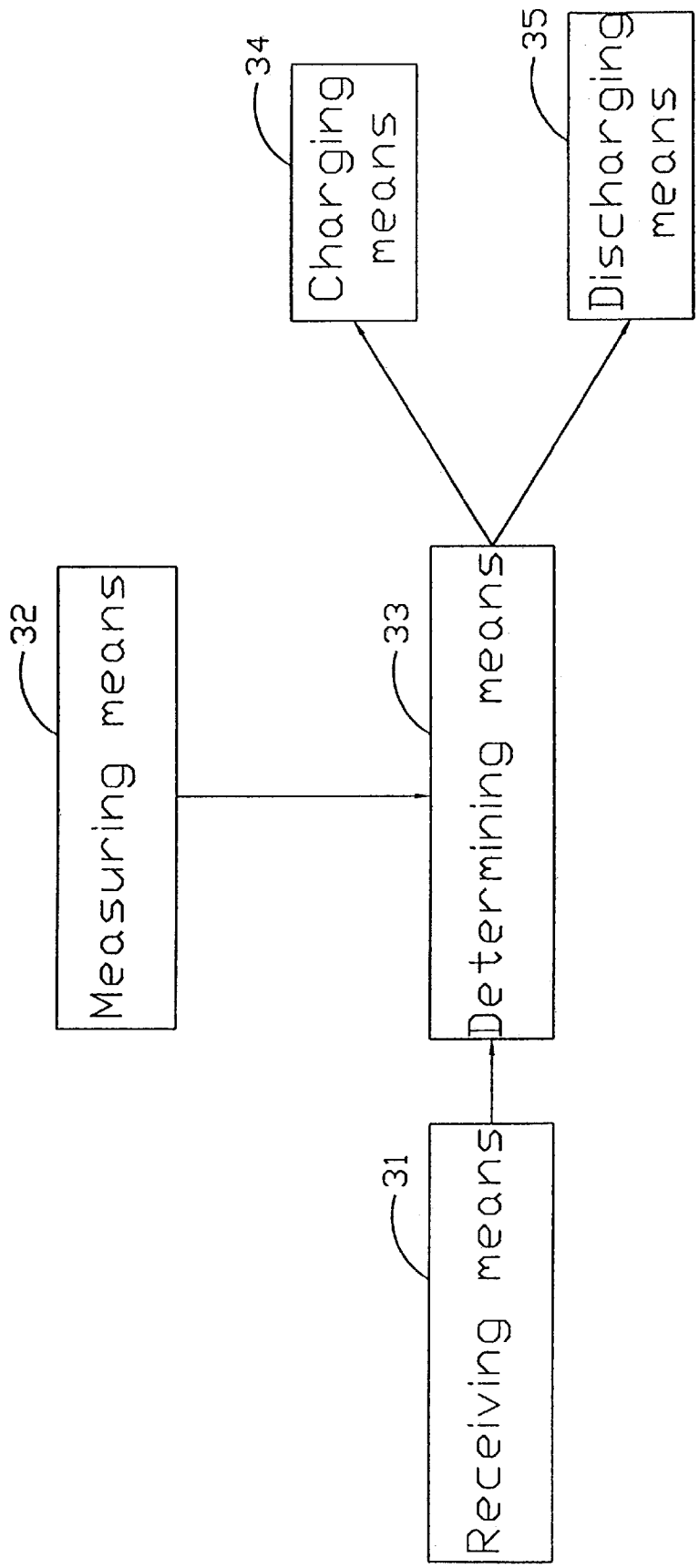
FIG. 3 is a brief structural map of the other preferred embodiment of the invention.

Another preferred embodiment of the invention is a system for a production line to remain electricity power account of a recharged battery set which built-in a portable electrical device. As FIG. 3 shows, the system at least includes: receiving means 31 for receiving a predetermined range and a predetermined period; measuring means 32 for measuring an actual account of electricity power of the recharged battery set; determining means 33 for comparing the actual account with the predetermined range and determining whether adjusting the actual account or not; charging means 34 for charging the recharged battery set and to let the actual account is modified into the predetermined range whenever the actual account is lower than the predetermined range; and discharging means 35 for discharging the recharged battery set and to let the actual account is modified into the predetermined range whenever the actual account is higher than the predetermined range.

Moreover, the system further comprises a timing means for activating the measuring means to measure the actual account per the predetermined period. Herein, the portable electronic device usually is notebook computer, and the recharged battery is chosen from the group consisting of lithium ion recharged battery and nickel-manganese-hydrogen recharged battery.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method for ensuring life of a recharged battery in a portable electronic device, the method comprising:

receiving a predetermined range of electricity power;

performing an electricity power testing process to measure an actual amount of electricity power of the recharged battery that is built-in the portable electronic device; and performing an electricity power adjusting process to enable said actual amount to be modified into said predetermined range whenever said actual amount is out of said predetermined range, wherein said electricity power adjusting process comprises a charging process which is performed whenever said actual amount is lower than said predetermined range, said charging process increasing said actual amount to enable said actual amount to be modified into said predetermined range, and wherein said electricity power adjusting process comprises a discharging process which is performed whenever said actual amount is higher than said predetermined range, said discharging process decreasing said actual amount to enable said actual amount to be modified into said predetermined range.

2. The method according in claim 1, wherein said recharged battery is suitable for longdated storage without reduction of lifetime whenever said actual account is in said predetermined range.

3. The method according in claim 1, wherein said predetermined range is about two fifth to three fifth of a maximum account of electricity power of said recharged battery.

4. The method according in claim 1, wherein said portable electronic device comprises notebook computer.

5. The method according in claim 1, wherein said recharged battery comprises lithium ion recharged battery.

6. A method for use in a production line to maintain electricity power of a recharged battery set which is built-in a portable electrical device, the method comprising:

(a) receiving a predetermined range and a predetermined period;

(b) performing a pre-charging process to enable said recharged battery set to be saturated;

(c) performing at least a portable electrical device testing process and recording a processing time during which an actual amount of electricity power of said recharged battery set is decreased of electrical power of said recharged battery set whenever said processing time excesses said predetermined period;

(e) performing an electricity power adjusting process to enable said actual amount to be modified into said predetermined range whenever said actual amount is out of said predetermined range; said electricity power adjusting process comprising:

performing a charging process to charge said recharged battery set and to enable said actual amount to be modified into said predetermined range whenever said actual amount is lower than said predetermined range; and performing a discharging process to discharge said recharged battery set and to enable said actual amount to be modified into said predetermined range whenever said actual amount is higher than said predetermined range; and (f) resetting said processing time to zero and repeating steps (b) to (f) until all said portable electrical device testing processes are finished, wherein both said electricity power testing process and said electricity power adjusting process are performed again after said portable electrical device testing processes are finished.

7. The method according in claim 6, wherein said recharged battery is suitable for longdated storage without reduction of lifetime whenever said actual account is in said predetermined range.

8. The method according in claim 6, wherein said predetermined range is about two fifth to three fifth of a maximum account of electricity power of said recharged battery.

9. The method according in claim 6, wherein said portable electronic device comprises notebook computer.

10. A system for use in a production line to maintain electricity power of a recharged battery set which is built-in a portable electrical device, the system comprising:

a receiving element for receiving a predetermined range and a predetermined period;

a measuring element for measuring an actual amount of electricity power of said recharged battery set;

a determining element for comparing said actual amount with said predetermined range and determining whether adjustment of said actual amount is required or not;

a charging element for charging said recharged battery set and to enable said actual amount to be modified into said predetermined range whenever said determining element finds said actual amount lower than said predetermined range; and a discharging element for discharging said recharged battery set and to enable said actual amount to be modified into said predetermined range whenever said determining element finds said actual amount higher than said predetermined range.

11. The system according to claim 10, further comprises a timing means for activating said measuring means to measure said actual account per said predetermined period.

12. The system according in claim 10, wherein said portable electronic device comprises notebook computer.

13. The system according in claim 10, wherein said recharged battery is chosen from said group consisting of lithium ion recharged battery and nickel-manganese-hydrogen recharged battery.

14. A method for use in a production line to maintain electricity power of a recharged battery set which is built-in a portable electrical device, the method comprising:

(a) receiving a predetermined range and a predetermined period;

(b) performing a pre-charging process to enable said recharged battery set to be saturated;

(c) performing at least a portable electrical device testing process and recording a processing time during which an actual amount of electricity power of said recharged battery set is decreased;

(d) performing an electricity power testing process to measure said actual amount of electrical power of said recharged battery set whenever said processing time excesses said predetermined period;

(e) performing an electricity power adjusting process to enable said actual amount to be modified into said predetermined range whenever said actual amount is out of said predetermined range; said electricity power adjusting process comprising:

performing a charging process to charge said recharged battery set and to enable said actual amount to be modified into said predetermined range whenever said actual amount is lower than said predetermined range; and performing a discharging process to discharge said recharged battery set and to enable said actual amount to be modified into said predetermined range whenever said actual amount is higher than said predetermined range; and (f) resetting said processing time to zero and repeating steps (b) to (f) until all said portable electrical device testing processes are finished, wherein both said electricity power testing process and said electricity power adjusting process are terminated after said portable electrical device testing processes are finished.

15. The method according to claim 14, wherein said recharged battery is suitable for elongated storage without reduction of lifetime whenever said actual amount is maintained in said predetermined range.

16. The method according to claim 14, wherein said predetermined range is about two fifth to three fifth of a maximum amount of electricity power of said recharged battery.

17. The method according to claim 14, wherein said portable electronic device comprises a notebook computer.

* * * * *